Dec. 13, 1955  R. O. HOGE  2,726,834
LEVELING DEVICE FOR CAMERAS AND THE LIKE
Filed Feb. 24, 1953  2 Sheets-Sheet 1

INVENTOR.
RALPH O. HOGE
BY Fulwider, Mattingly & Babcock
Attorneys

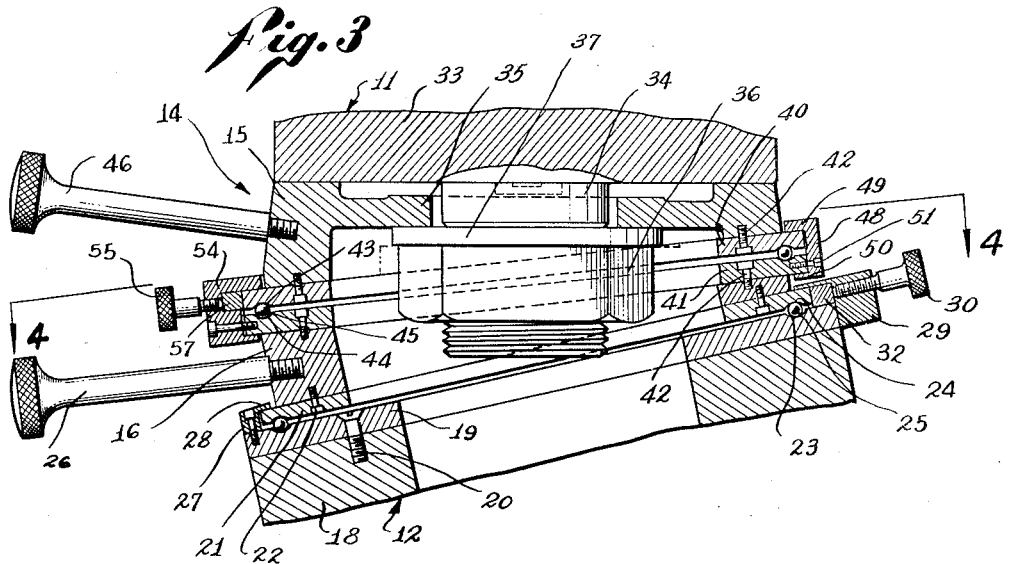
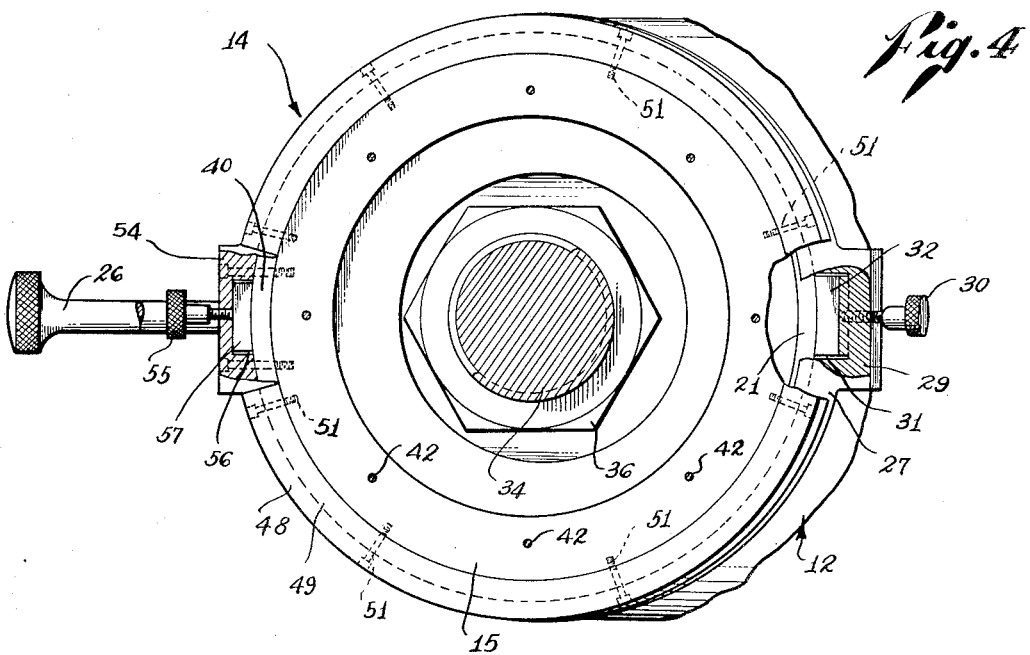

United States Patent Office 2,726,834
Patented Dec. 13, 1955

2,726,834

LEVELING DEVICE FOR CAMERAS AND THE LIKE

Ralph O. Hoge, Los Angeles, Calif.

Application February 24, 1953, Serial No. 338,509

3 Claims. (Cl. 248—180)

My invention relates generally to leveling devices, and more particularly to an improved leveling device for use with a moving picture camera or other heavy object, which levels the camera base by a very simple adjustment.

While conventional camera mounts have leveling mechanisms of one kind or another, these are generally unsatisfactory because of the difficulty and time required to obtain proper adjustment. For example, if adjustment means are provided in each leg of a tripod, a great number of adjustments are required to obtain even approximate level since each adjustment affects the others, and each correction introduces another new error. Furthermore, it is awkward and difficult to adjust the legs of a tripod supporting a heavy object.

In other mechanisms, a tiltable plate is supported on a number of spaced leveling screws which are raised and lowered to adjust one point on the plate. Again, each adjustment affects those previously made, and it is only after a number of fine compensating adjustments that the supported object may be leveled. Such a mechanism also has a very limited range of adjustment which may not be sufficient to meet the conditions encountered. In the shooting of motion pictures, all kinds of shots are required, and the camera is moved frequently. Therefore it can be appreciated that it is quite advantageous to be able to level the camera mount accurately and rapidly.

With the foregoing in mind, it is a major object of my invention to provide an improved leveling device which is easily and rapidly adjusted in a single operation.

Another object of the invention is to provide a leveling device which permits a fine adjustment and has a relatively great range of adjustment.

It is also an object of the invention to provide a leveling device which can be adjusted without lifting the base, and which operates smoothly with a heavy load mounted thereon.

A further object of the invention is to provide a leveling device which will compensate for any possible directional inclination of the supporting base.

An additional object of the invention is to provide a leveling device which can be quickly and positively locked in an adjusted position.

It is a still further object of my invention to provide a leveling device having adjustment controls within easy reach of the operator, and requires a minimum of physical effort in use.

Still another object of the invention is to provide a leveling device which is ruggedly built to withstand rough usage, and which is yet simple and economical in construction.

These and other objects and advantages of my invention will become apparent from the following detailed description of a preferred form thereof, and from an inspection of the accompanying drawings, in which:

Fig. 3 is a view similar to Fig. 2, showing the leveling members rotated for adjusting the position of the camera relative to the base; and Fig. 4 is a sectional view taken along the line 4—4 of Fig. 3.

Figure 1:
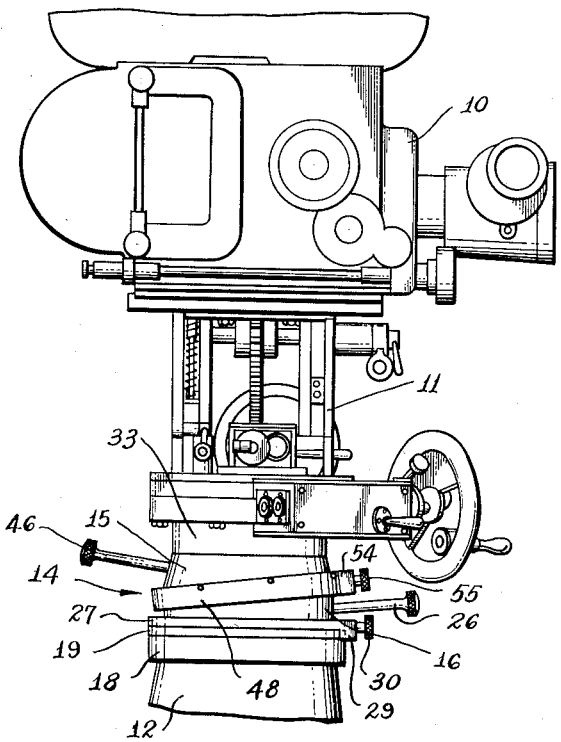
Fig. 1 is a side elevational view of a camera mount showing my improved leveling device mounted therein.

Referring now to the drawings, and particularly to Fig. 1 thereof, the general arrangement of a mount for a camera 10 is seen. Camera 10 is supported on a camera head 11 which permits the camera to be moved about mutually perpendicular axes during its operation. Such a camera head is disclosed in my Patent No. 2,582,779, issued January 15, 1952, for Camera Head. Below the head 11 is a suitable supporting base 12 which is typically of portable construction having tripod legs or the like (not shown). While base 12 stands approximately vertical, it may tilt or incline somewhat, depending upon the character of the ground or platform on which it is seated. However, for proper operation camera head 11 should be exactly leveled, or in other words its base or table should lie in a true horizontal reference plane. For this reason I provide a leveling device indicated generally at 14, which is mounted between camera head 11 and base 12.

Leveling device 14 consists basically of a pair of relatively rotatable upper and lower wedge members 15 and 16 which are connected to camera head 11 and base 12, respectively. Upon rotation of the members 15 and 16, the upper member is tilted or inclined with respect to the lower member and thus serves to level camera head 11. After camera head 11 has been leveled, leveling device 14 is locked in position so that no further movement of members 15 and 16 occurs. The nature of the construction is such that both wedge members 15 and 16 are rotatable relative to base 12. Thus I am able to compensate for any possible inclination of base 12 by a selected position of members 15 and 16 relative to each other, and to base 12.

Figure 2:
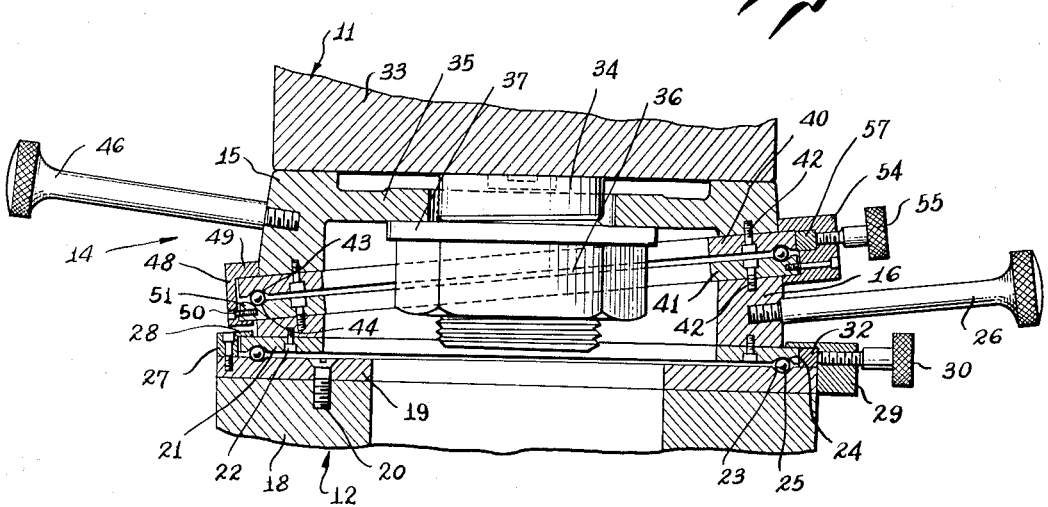
Fig. 2 is a vertical diametral section through the leveling device.

As is seen in Fig. 2, base 12 has an upper cylindrical wall 18 to which is rigidly mounted a flat bearing ring 19 by fastening means 20. Superimposed on bearing ring 19 is a cooperating flat bearing ring 21 which is secured to the bottom of wedge member 16 by fastening means 22. The outer diameter of ring 21 is somewhat smaller than that of ring 19 so as to provide an outer stepped arrangement. Rings 19 and 21 are formed with annular opposed grooves 23 and 24, respectively, which serve as bearing races for a plurality of ball bearings 25 that space the bearing rings apart for low-friction rotation.

Wedge member 16 is preferably formed as an annular ring having a flat upper surface cut at an angle to a flat lower surface, so that in sectional view it has one side of relatively great depth and the other side of shallow depth. By reason of the bearing means just described, it can be seen that wedge member 16 is freely rotatable with respect to base 12. To turn the wedge member 16 on base 12, a control handle or rod 26 has its inner end threadedly engaged in the wall of the wedge member, and projects radially outwardly.

In order to prevent separation of bearing rings 19 and 21, a flanged locking ring 27 is secured rigidly to the outer portion of ring 19 and has an inner flange or projection 28 which overrides ring 21, and prevents any upward movement of the latter. In addition, ball bearings 25 are shielded from the entry of dirt or foreign matter by this construction.

Locking ring 27 also serves to position a clamping means for preventing relative rotation between wedge member 16 and base 12. To this end, one side of ring 27 is projected outwardly to form a generally rectangular block 29 which takes a threaded radially extending clamping or set screw 30. As is best seen in Fig. 4, clamping block 29 is internally slotted to form an inner chamber 31 which slidably receives a braking shoe 32. The outer face of shoe 32 engages against the inner end of set screw 30, while the inner face is shaped to bear against the periphery of ring 21. Upon inward rotation of set screw 30, shoe 32 is forced into firm frictional engagement with ring 21. Since clamping block 29 is affixed to base 12, and ring 21 to wedge member 16, the engagement of shoe 32 prevents any relative rotation between the wedge member and base.

The upper wedge member 15 is formed as an annular ring having a flat upper surface inclined to a flat lower surface to form in section a low and a high side. The angle of inclination between the surfaces of wedge member 15 is the same as the corresponding angle of wedge member 16, so that when they are positioned with the high sides in diametrically opposed relationship, as is seen in Fig. 2, they mate complementally to provide zero correction. The upper surface of member 15 abuts against the bottom of a mounting base or table 33 which forms a portion of the camera head 11. Projecting downwardly from table 33 is a central stud 34 which is used to secure member 15 in place. A web or spider 35 extends inwardly from the wall of member 15 and is centrally bored to receive stud 34 therethrough. The end of stud 34 is fitted with a lock nut 36 and washer 37 which bear upwardly against web 35 to secure member 16 rigidly to table 33 for rotation therewith.

Between members 15 and 16 are a pair of flat bearing rings 40 and 41, the upper ring 40 being secured to member 15 by fasteners 42, and the lower ring 41 being similarly secured to member 16. In the adjacent faces of the rings 40 and 41 are opposed annular grooves 43 and 44, respectively, which serve as races for a plurality of ball bearings 45. Rings 40 and 41 are spaced apart by bearings 45 so that member 15 is freely rotatable with respect to member 16. To turn member 15, a control handle or rod 46 has its inner end threadedly engaged in the wall of member 15, and projects radially outwardly.

To prevent separation of bearing rings 40 and 41, a flanged locking ring 48 is fitted to the outside of the bearing rings, and has an upper flange 49 and lower flange 50 which extend inwardly to bracket the bearing rings therebetween. Ring 48 encloses the ends of rings 40 and 41 and shields the bearings 45 from the entry of dirt and foreign matter therein. For ease of installation, ring 48 is preferably split into semi-circular halves which are secured rigidly to bearing ring 41 by fastening screws 51. Upper bearing ring 40 is not secured to locking ring 48, and is freely rotatable relative thereto.

Ring 48 also serves as a mount for a clamping means which functions to lock members 15 and 16 against relative rotation. To this end, one side of ring 48 is extended outwardly to form a generally rectangular block 54 which takes a threaded clamping or set screw 55 therein. Block 54 is internally slotted to form a chamber 56 which slidably receives a brake shoe 57. The outer end of shoe 57 engages against the inner end of screw 55, and the inner surface of the shoe is shaped to fit tightly against the peripheral surface of ring 40. By rotatably advancing screw 55 inwardly, shoe 57 is driven frictionally against ring 40 to hold the latter against rotation. Since ring 40 is secured non-rotatably to member 15, and shoe 57 and ring 41 are secured non-rotatably to member 16, it can be seen that members 15 and 16 are thus locked against relative rotation.

In the use of the device, both clamping screws 30 and 55 are loosened so that member 16 is rotatable relative to base 12 and member 15 is rotatable relative to member 16. The operator then grasps control handles 26 and 46 and turns them so as to compensate for any inclination of base 12, and bring the camera head 11 into a level position. It should be noted that rotation of member 16 relative to member 15 from the position shown in Fig. 2 to that shown in Fig. 3 brings the high sides of the wedge members together so as to correct for a substantial inclination of base 12. In an intermediate relative rotational position, the members 15 and 16 may compensate for any lesser angle of inclination of base 12. It should also be noted that since both members 15 and 16 are rotatable relative to base 12, they may be shifted relative to the base to compensate for inclination of base 12 in any direction.

After members 15 and 16 have been rotated to the proper positions, set screws 30 and 55 are tightened so as to prevent further rotation, and lock the table 33 of camera head 11 firmly to base 12. While the device is capable of compensating for a relatively great inclination of base 12, it can be appreciated that the rate of change of inclination between members 15 and 16 is small for any increment of rotation therebetween. Thus it is possible to make a very fine adjustment in the level of head 11 in the single operation just described.

While I have thus shown and described a preferred embodiment of my invention, it will be understood that changes of design and construction will be apparent to those skilled in the art without departing from the invention. Therefore I do not wish to be restricted to the foregoing details of construction, except as defined in the appended claims.

I claim:

1. A leveling device comprising: a mounting base; a lower wedge member having a flat upper face inclined to a flat lower face; a first pair of bearing rings mounted between said base and said lower wedge member, one of said rings being secured rigidly to said base and the other to said member; a plurality of rolling element bearings between said bearing rings; an outer locking ring preventing separation of said bearing rings and affixed non-rotatably to one of said rings; a clamping block projecting outwardly from said locking ring; a set screw in said block to clamp frictionally against the non-affixed bearing ring to hold said lower wedge member from rotation relative to said base; an upper wedge member having a flat upper face inclined to a flat lower face; a second pair of bearing rings mounted between said upper and lower wedge members, one of said rings being secured rigidly to each of said members; a plurality of rolling element bearings between said second pair of bearing rings; an outer locking ring preventing separation of said second pair of bearing rings and affixed non-rotatably to one of said second pair; a second clamping block projecting outwardly from said last-mentioned ring; and a set screw in said second block to clamp frictionally against the non-affixed one of said second pair of bearing rings to hold said lower and upper wedge members against relative rotation.

2. A leveling device comprising: a mounting base; a lower wedge member having a flat upper face inclined to a flat lower face; a first pair of bearing rings mounted between said base and said lower wedge member, one of said rings being secured rigidly to said base and the other to said member; a plurality of rolling element bearings between said bearing rings; an outer locking ring preventing separation of said bearing rings and affixed non-rotatably to one of said rings; a clamping block projecting outwardly from said locking ring and having an inner chamber therein; a brake shoe slidably mounted in said chamber and movable against the periphery of the non-affixed bearing ring to hold said lower wedge member from rotation relative to said base; a set screw in said clamping block to move said shoe inwardly; an upper wedge member having a flat upper face inclined to a flat lower face; a second pair of bearing rings mounted between said upper and lower wedge members, one of said rings being secured rigidly to each of said members; a plurality of rolling element bearings between said second pair of bearing rings; an outer locking ring preventing separation of said second pair of bearing rings and affixed non-rotatably to one of said second pair; a second clamping block projecting outwardly from said last-mentioned ring and having an inner chamber therein; a second brake shoe slidably mounted in said last-mentioned chamber and movable against the periphery of the non-affixed one of said second pair of bearing rings to hold said upper and lower wedge members against relative rotation; and a set screw in said clamping block to move said shoe inwardly.

3. A leveling device comprising: a cylindrical mounting base having a flat upper surface; a lower wedge member shaped as an annular ring having a flat upper face inclined to a flat lower face; a first pair of bearing rings mounted between said base and said lower wedge member and formed with opposed annular bearing races, one of said rings being secured rigidly to said base and the other to said member; a plurality of ball bearings between said bearing rings in said races; an outer locking ring preventing separation of said bearing rings and affixed non-rotatably to one of said rings; a clamping block projecting outwardly from said locking ring and having an inner chamber therein; a brake shoe slidably mounted in said chamber and movable against the periphery of the non-affixed bearing ring to hold said lower wedge member from rotation relative to said base; a set screw in said clamping block to move said shoe inwardly; an upper wedge member shaped as an annular ring having a flat upper face inclined to a flat lower face, the angles of inclination of the faces of said upper and lower members being equal; a second pair of bearing rings mounted between said upper and lower wedge members and formed with opposed annular bearing races, one of said rings being secured rigidly to each of said members; a plurality of ball bearings between said second pair of bearing rings in said races; a second clamping block projecting outwardly from said last-mentioned ring and having an inner chamber therein; a second brake shoe slidably mounted in said last-mentioned chamber and movable against the periphery of the non-affixed one of said second pair of bearing rings to hold said upper and lower wedge members against relative rotation; a set screw in said clamping block to move said shoe inwardly; and a handle projecting outwardly from each of said wedge members for turning said members relative to each other and to said base.

References Cited in the file of this patent

UNITED STATES PATENTS

| | | |
|---|---|---|
| 319,743 | Parker | June 9, 1885 |
| 705,237 | Hatch | July 22, 1902 |
| 1,092,867 | Sellew | Apr. 14, 1914 |
| 1,182,881 | Frye | May 9, 1916 |
| 1,533,500 | Hovda | Apr. 14, 1925 |
| 1,928,182 | Mahoney | Sept. 26, 1933 |
| 2,313,084 | Manly | Mar. 9, 1943 |
| 2,605,989 | Luft | Aug. 5, 1952 |

FOREIGN PATENTS

| | | |
|---|---|---|
| 2,595 | Great Britain | Feb. 2, 1910 |
| 13,876 | Great Britain | June 8, 1910 |